US006945700B2

(12) United States Patent
Fugel et al.

(10) Patent No.: US 6,945,700 B2
(45) Date of Patent: Sep. 20, 2005

(54) AXIAL ANGLE DISK

(75) Inventors: Wolfgang Fugel, Nürnberg (DE); Alexander Reimchen, Fürth (DE)

(73) Assignee: INA-Schaeffler KG, Herzogenaurach (DE)

( * ) Notice: Subject to any disclaimer, the term of this patent is extended or adjusted under 35 U.S.C. 154(b) by 106 days.

(21) Appl. No.: 10/600,486

(22) Filed: Jun. 20, 2003

(65) Prior Publication Data

US 2004/0105604 A1 Jun. 3, 2004

(30) Foreign Application Priority Data

Jun. 20, 2002 (DE) ........................................ 102 27 377

(51) Int. Cl.[7] ................................................ F16C 19/30
(52) U.S. Cl. ........................................................ 384/620
(58) Field of Search .......................... 384/618, 620–622

(56) References Cited

U.S. PATENT DOCUMENTS 3,999,816 A 12/1976 Pitner
5,110,223 A 5/1992 Koch et al.
RE34,813 E * 12/1994 Gardella ..................... 384/620

FOREIGN PATENT DOCUMENTS

| | | |
|---|---|---|
| DE | 2 264 117 | 7/1973 |
| DE | 25 07 900 C2 | 9/1985 |
| DE | 38 40 957 C3 | 2/1992 |
| DE | G 92 14 980.4 | 2/1993 |
| DE | 44 16 320 A1 | 1/1995 |
| DE | 39 35 633 C2 | 5/1995 |
| DE | 195 42 600 A1 | 5/1997 |
| DE | 199 23 756 A1 | 12/1999 |

* cited by examiner

*Primary Examiner*—Thomas R. Hannon
(74) *Attorney, Agent, or Firm*—Volpe and Koenig, P.C.

(57) ABSTRACT

An axial angle disk, formed in one piece, has a radial segment to which an axially bent part is connected that is provided at at least one point on a periphery thereof with a holding projection that protrudes radially. The holding projection (2.2.1, 5.2.1, 8.2.1, 8.3.1) is formed with by stamping such that an uninterrupted material connection is realized between the bent part (2.2, 5.2, 8.2, 8.3) and the holding projection (2.2.1, 5.2.1, 8.2.1, 8.3.1). The projection height, extending in the radial direction, has maximum magnitude s of ⅔ of the wall thickness b of the axially bent part (2.2, 5.2, 8.2, 8.3).

4 Claims, 4 Drawing Sheets

Fig. 1
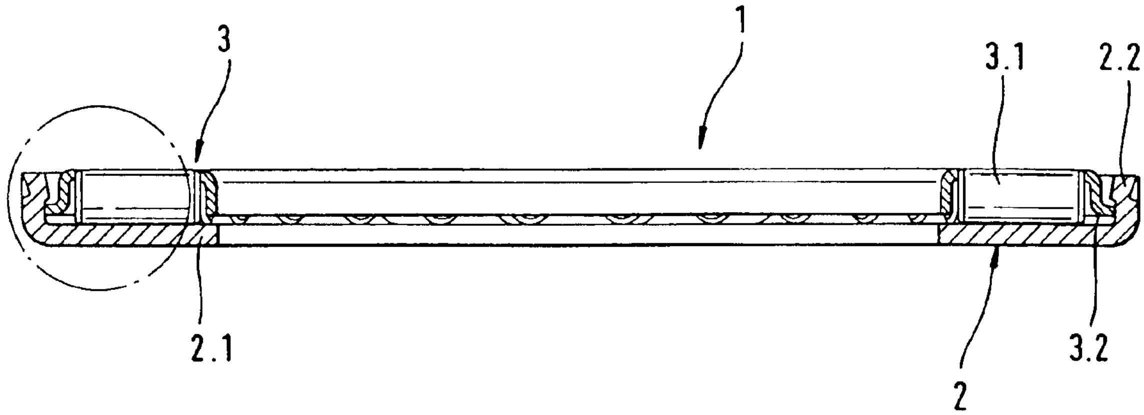
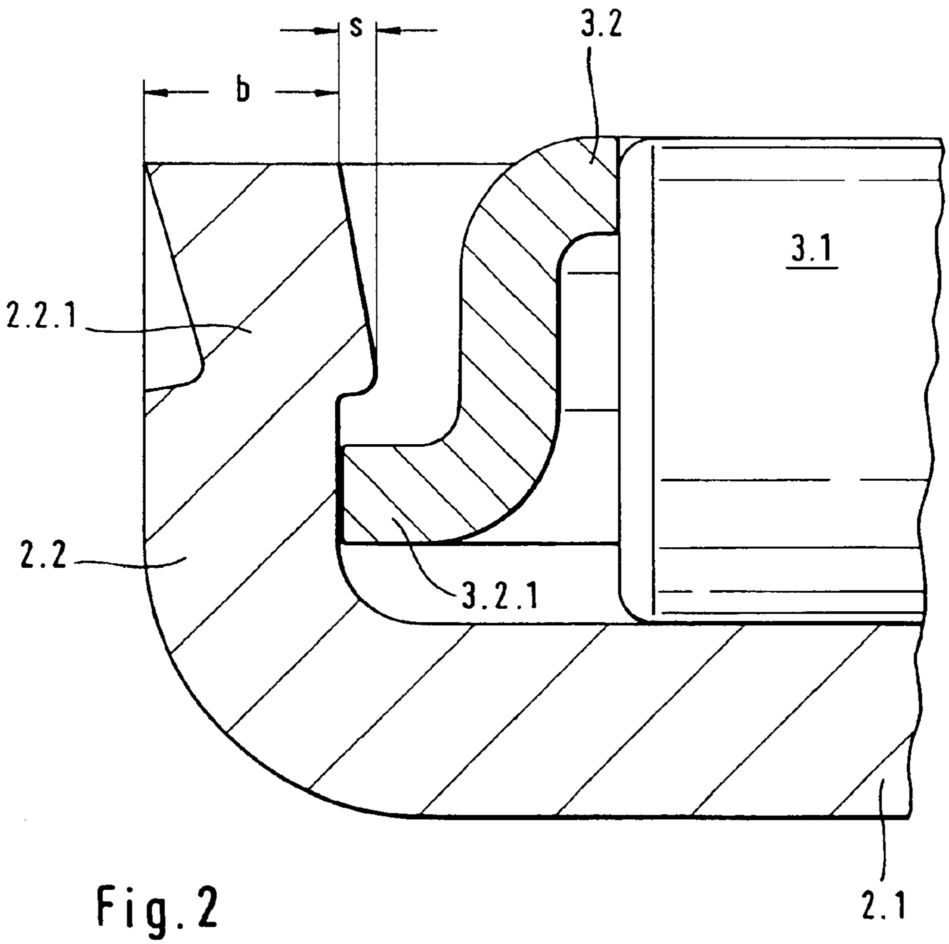
Fig. 2

AXIAL ANGLE DISK

BACKGROUND

The invention relates to an axial angle disk formed in one piece, in particular for a thrust bearing, having a radial segment that forms a raceway, to which there is connected at least one axially bent part that is provided at at least one point on its periphery with a radially protruding holding projection that engages an associated component from behind so that a captive packaged unit is formed that is made up of the axial angle disk and the component, and/or that engages in an associated recess of a connected construction, so that a captive packaged unit is formed that is made up of the axial angle disk and the connected construction, the holding projection having a path in the direction of assembly that climbs at an angle, and having at its end a sloping edge that falls away in the radial direction.

An axial angle disk of this type is known from DE-OS 22 64 117. The axial angle disk shown in FIGS. 1 and 2 has a radial segment that forms a raceway, an axially bent part being connected to the outer peripheral end of this segment. At three peripheral points spaced uniformly from one another, the axially bent part is provided with holding projections that engage from the rear an axial cage equipped with cylindrical rollers, so that a packaged unit is formed that is made up of the axial angle disk and the roller ring. The holding projections protrude from the axial bent part at an acute angle in the direction of the bearing axis of the bearing, and have a sloping edge that falls away at their end oriented in the direction of the radial segment. In this way, it is enabled that the axial needle ring is pushed into the axial angle disk in the direction of the radial segment, in the manner of a shoehorn, until the holding projection snaps into place behind the axial needle ring. In the cited prior publication, these holding projections are realized in such a manner that at least one cut, i.e., a material division, is present in the axially bent part, from which the holding projection is formed in the radial direction with the aid of a punch.

A disadvantage of this is that the sloping edge is formed as a cutting edge, so that the cut can cause cracks to occur that can result in the breaking off of the entire holding projection. A further disadvantage is that such cracks can extend into the raceway area of the thrust bearing. In the extreme case, this has the result that the entire bearing fails. Another disadvantage here is that the cutting edge results in a rough surface that the cage runs up against. This can damage the cage, or in the extreme case can result in a damaging formation of chips. Finally, the required cut means that the formation of the holding projection is relatively expensive, because the punch has to be provided with a sharp cutting edge.

SUMMARY

The object of the present invention is therefore to develop an axial angle disk that on the one hand is easy to manufacture and that on the other hand allows a secure fixing.

According to the present invention, this object is achieved in that the holding projection is produced with the aid of a stamping, in such a way that an uninterrupted material connection is realized between the bent part and the holding projection, the projection extending in the radial direction assuming a maximum height of ⅔ of the wall thickness of the axially bent part, and the holding projection being formed with a rounded shape.

Due to the absence of the cuts, this design according to the present invention of the axial angle disk avoids the formation of possible cracks that can negatively influence the functioning of the axial angle disk in the way described above. It was found that even in the case of a purely non-machining formation of the holding projections without cuts, the height thereof may assume a magnitude no greater than ⅔ of the wall thickness of the axially bent part, and must be rounded, because the occurrence of cracks can be reliably prevented only under these conditions. Through the present invention, a stable, compact holding projection is realized having a precisely defined shape, whose surface quality is very flat and thus minimizes friction.

In another aspect of the invention, the axially bent part is situated on the outer peripheral end of the radial segment, and the holding projection engages a cage from the rear, so that a thrust bearing made up of the axial angle disk and the cage is formed.

According to a further feature of the present invention, the axially bent part is to be situated on the inner peripheral end of the radial segment, and the holding projection is to engage in an associated recess of a housing, so that a captive packaged unit is formed that is made up of the thrust bearing and the housing.

According to a further aspect of the invention, the holding projections are to be situated at a plurality of peripheral points having a uniform spacing from one another.

According to another aspect of the invention, the holding projection is to engage in a circumferential groove; and in a preferred aspect of the invention, the groove is provided with a rectangular or triangular form when viewed in longitudinal section.

BRIEF DESCRIPTION OF THE DRAWINGS

The invention is explained in more detail below, on the basis of the following exemplary embodiments.

FIG. 1 shows a longitudinal section through a thrust bearing according to the present invention, FIG. 2 shows an enlarged view of a detail according to FIG. 1, FIGS. 3, 4, and 5 show the mounting of a bearing according to the present invention into a connected construction.

DETAILED DESCRIPTION OF THE PREFERRED EMBODIMENT

Figure 3:
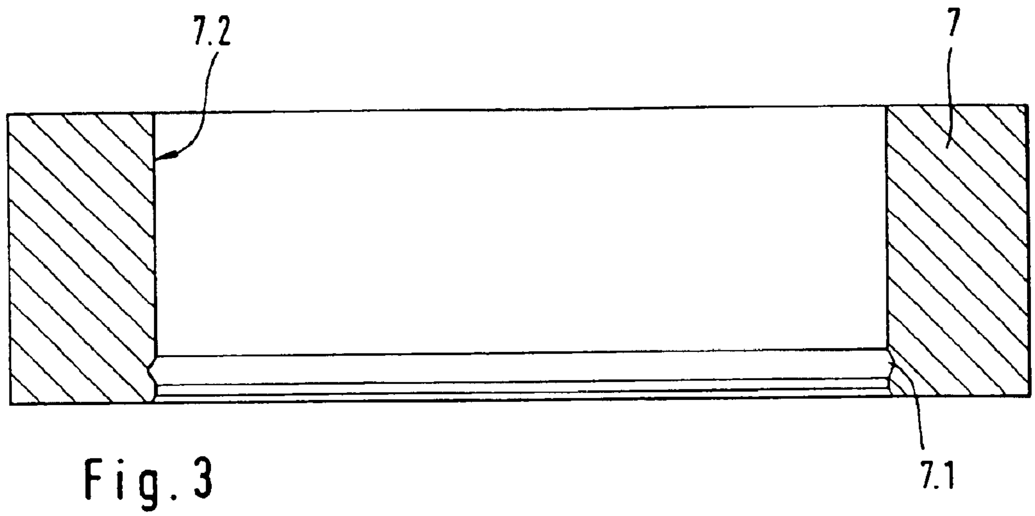
Figure 4:
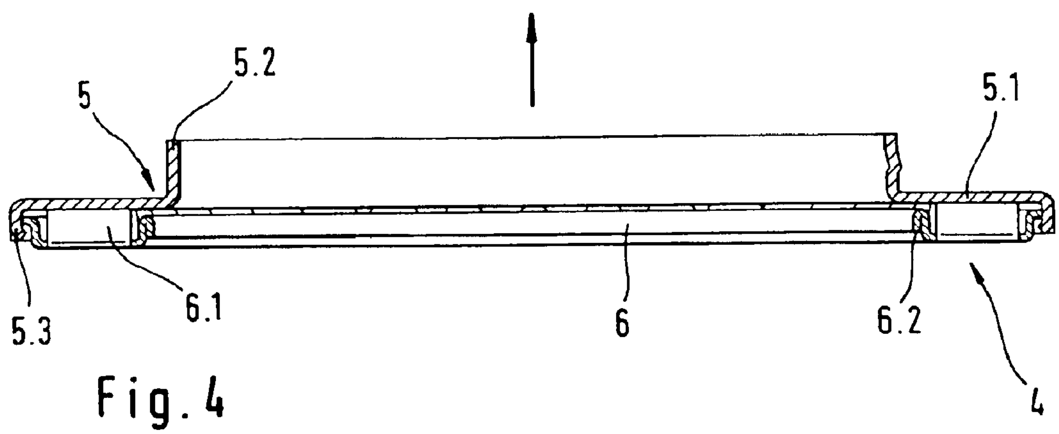
Figure 5:
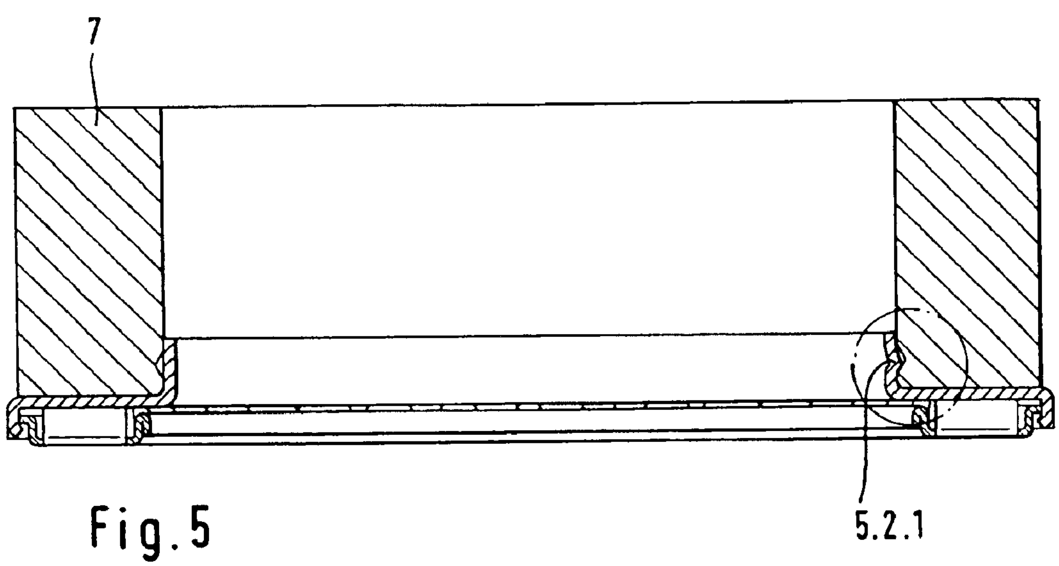
Figure 6:
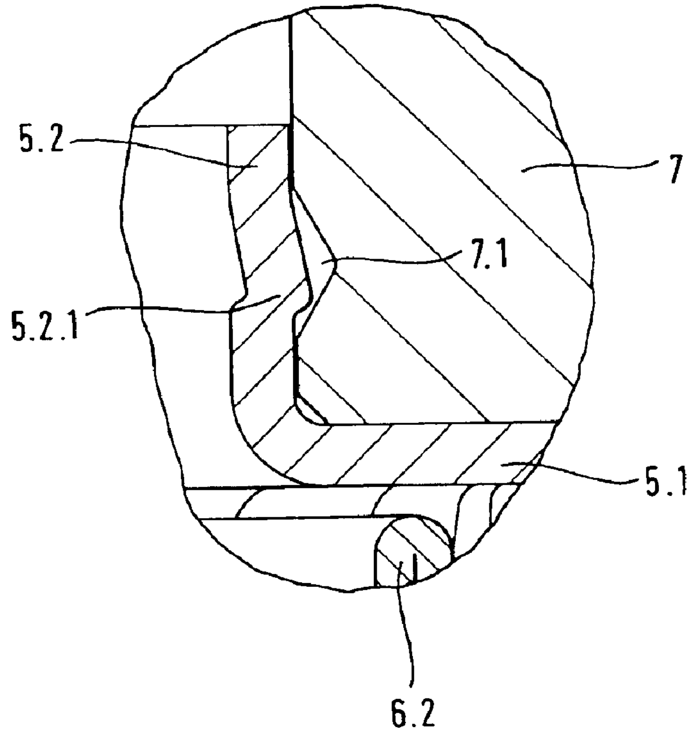
FIGS. 6 and 7 show an enlarged view of a detail from FIG. 5.

The thrust bearing 1 shown in FIGS. 1 and 2 is made up of an axial angle disk 2, having a radial segment 2.1 on its outer end, i.e., on its outer diameter, into which axially bent part 2.2 merges. The radial segment 2.1 forms a raceway for axial needle ring 3, made up of bearing needles 3.1 and a bearing cage 3.2. As can be seen in particular in the enlarged view in FIG. 2, the axially bent part 2.2 of axial angle disk 2 is provided with a holding projection 2.2.1 that is manufactured by material displacement, through a stamping process. Here, the holding projection 2.2.1, which extends locally from the bent part 2.2 in radial fashion, is produced without cutting, using a punch and an associated die. It can further be seen that, seen from above, from the direction from which the axial needle ring 3 is pushed into the axial angle disk 2 during the assembly process, the holding projection 2.2.1 climbs at an acute angle, and at its end falls off radially outwardly at a steep angle. The height of the projection, designated s, is dependent on the radial tolerance between the axial angle disk 2 and the bearing cage 3.2, and must be at least as large as the radial play thereof. According to the present invention, projection height s should not exceed a maximum magnitude of ⅔ of wall thickness b of the axial bent part 2.2. In this way it is ensured that even during the punching process no fine cracks can arise that could have a disadvantageous effect on the bearing as a whole, as described above. As FIG. 2 further shows, the seating of a radial flange 3.2.1 of the bearing cage 3.2 on the holding projection 2.2.1 prevents the axial needle ring 3 from sliding out axially. At the same time, the possibility of axial motion of the axial needle ring 3 is determined by the distance from the lower edge up to the radial segment 2.1. Seen from the assembly side, the holding projection 2.2.1 has the shape of a harpoon, so that after the snapping in, the bearing cage 3.2 cannot leave axial angle disk 2. When the bearing cage 3.2 is pushed into the axial angle disk 2, this cage will deform elastically due to the fact that its stability is less than that of the axial angle disk 2. The number of holding projections 2.2.1 that are used is dependent on the diameter of the axial angle disk 2. The greater the diameter, the greater the number of holding projections 2.2.1 that are to be provided, because if the number is reduced, the degree of overlapping increases, which makes assembly more difficult. It has proven advantageous to provide six holding projections 2.2.1 if the diameter of axial angle disk 2 is greater than 60 mm.

Figure 7:
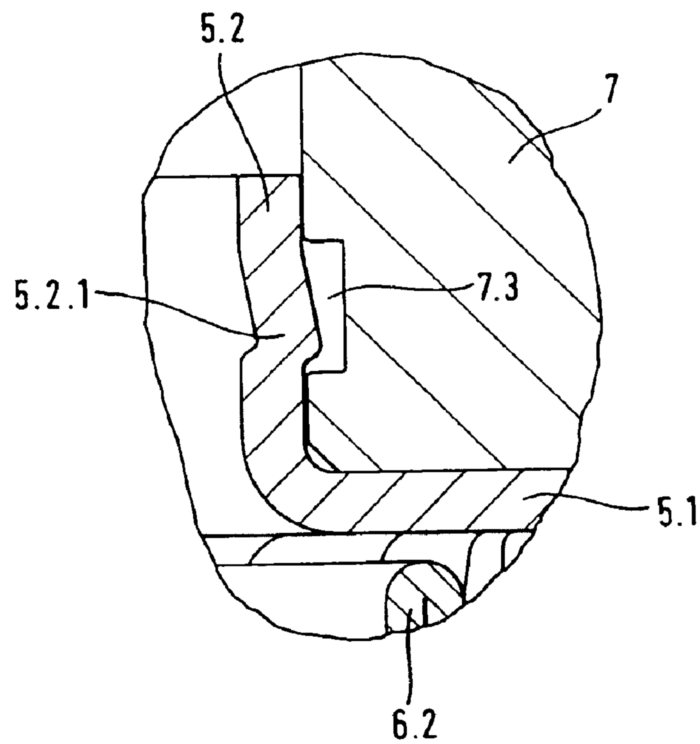

In FIGS. 3, 4, 5, and 6, a thrust bearing 4 is shown whose axial angle disk 5 has, again, a radial segment 5.1 that acts as a raceway for bearing needles 6.1, found in a cage 6.2, of axial needle ring 6. The axial angle disk 5 is thus provided both on its outer and on its inner peripheral end, or, synonymously, its outer and inner diameter, with axially bent parts 5.3., 5.2, which extend in opposite directions. According to the present invention, inner axial bent part 5.2 is provided with holding projections 5.2.1, which snap into a groove 7.1 of a housing 7, so that the thrust bearing 4 is affixed firmly to this housing. As FIGS. 3, 4, and 5 also show, the thrust bearing 4 is moved towards the housing 7 in the direction of the arrow, that is, in the direction of assembly, and its inner axial bent part 5.2 is introduced into a receiving hole 7.2 in the housing 7 and snaps in there. The groove 7.3 shown in FIG. 7 differs only in its shape from the groove shown in FIG. 6. It has a rectangular shape.

Figure 8:
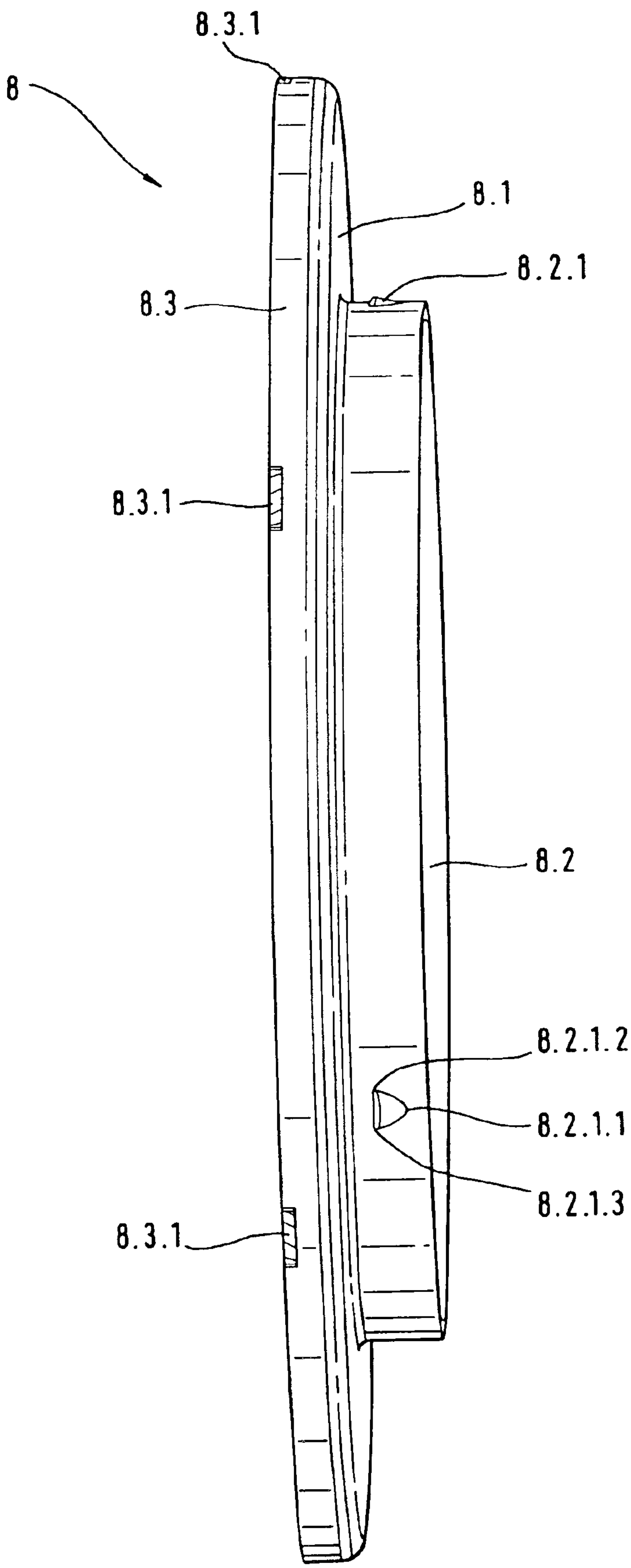
FIG. 8 shows a perspective view of an axial angle disk according to the present invention.

Finally, FIG. 8 shows a perspective view of another axial angle disk 8, having in turn radial segment 8.2, which at its inner diameter merges into axial bent part 8.2, and at its outer diameter merges into axial bent part 8.3. According to the present invention, both of the bent parts 8.2, 8.3 are provided with holding projections 8.2.1, 8.3.1 that are oriented oppositely to one another. In this Figure, the rounded design of the holding projection 8.2.1 can be seen especially well. This projection has its origin at point 8.2.1.1, climbs in the axial direction, and expands in the peripheral direction, and terminates at points 8.2.1.2 and 8.2.1.3, which are situated at a distance from one another. Points 8.2.1.2 and 8.2.1.3 are connected with one another by a curved line. In this way, holding projections 8.2.1 and 8.3.1 are created, which have a precisely defined, compact, and thus stable shape, and a high surface quality.

REFERENCE CHARACTERS

1 thrust bearing
2 axial angle disk
2.1 radial segment
2.2 axially bent part
2.2.1 holding projection
3 axial needle ring
3.1 bearing needle
3.2 cage
3.2.1 radial flange
4 thrust bearing
5 axial angle disk
5.1 radial segment
5.2 axially bent part
5.2.1 holding projection
5.3 axially bent part
6 axial needle ring
6.1 bearing needle
6.2 cage
7 housing
7.1 groove
7.2 receiving bored hole
7.3 groove
8 axial angle disk
8.1 radial segment
8.2 axially bent part
8.2.1 holding projection
8.2.1.1 point
8.2.1.2 point
8.2.1.3 point
8.3 axially bent part
8.3.1 holding projection
s projection height
b wall thickness

What is claimed is:

1. Axial angle disk formed in one piece, adapted for use in a thrust bearing, the axial angle disk comprising: a radial segment that forms a raceway to which first and second axially bent parts are connected that are each provided at at least one point on a periphery thereof with respective first and second holding projections that protrude radially, the projections being adapted to engage an associated component from behind so that a captive packaged unit made up of the axial angle disk and the component is formed, and is adapted to engage in an associated recess of a connected construction so that a captive packaged unit made up of the axial angle disk and the connected construction is formed, the holding projections having a path that climbs at an angle in a direction of assembly, and having at an end thereof a sloping edge that falls away in a radial direction, wherein the first axially bent art (2.2) is situated at an outer peripheral end of the radial segment (2.1), and the first respective holding projection (2.2.1) engages a cage (3.2) from behind, so that a thrust bearing is formed that is made up of the axial angle disk (2) and the cage (3.2), and the second axially bent part (5.2, 8.2) is situated on an inner peripheral end of the radial segment (5.1, 8.1), and the second respective holding projection (5.2.1, 8.2.1) engages in an associated recess (7.1, 7.3) of a housing (7), so that a captive packaged unit is formed that is made up of a thrust bearing (4) and the housing (7), the holding projections (2.2.1, 5.2.1, 8.2.1, 8.3.1) are formed by a stamping, and an uninterrupted material connection is formed between the bent part (2.2, 5.2, 8.2, 8.3) and the holding projections (2.2.1, 5 2.1, 8.2.1, 8.3.1), a projection height of the projections, extending in the radial direction, has a maximum size s of ⅔ of a wall thickness b of the axially ben part (2.2, 5.2, 8.2, 8.3), and the holding projections (2.2.1, 5.2.1, 8.2.1, 8.3.1) have a rounded shape.

2. Axial angle disk (2, 5, 8) as recited in claim 1, wherein there are a plurality of holding projections (2.2.1, 5.2.1,

8.2.1, 8.3.1) that are situated at a plurality of peripheral points that are spaced uniformly from one another.

3. Axial angle disk (5) as recited in claim 1, wherein the second holding projection (5.2.1) engages in a circumferential groove (7.1, 7.3).

4. Axial angle disk (5) as recited in claim 3, wherein the groove (7.1, 7.3) has a rectangular or a triangular path in a longitudinal cross-section.

* * * * *